US011429531B2

(12) United States Patent
Meiri et al.

(10) Patent No.: US 11,429,531 B2
(45) Date of Patent: Aug. 30, 2022

(54) CHANGING PAGE SIZE IN AN ADDRESS-BASED DATA STORAGE SYSTEM

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 177 days.

(21) Appl. No.: 16/779,749

(22) Filed: Feb. 3, 2020

(65) Prior Publication Data

US 2021/0240628 A1 Aug. 5, 2021

(51) Int. Cl.
*G06F 12/02* (2006.01)
*G06F 9/50* (2006.01)
*G06F 3/06* (2006.01)
*G06F 12/0882* (2016.01)
*G06F 16/22* (2019.01)
*G06F 16/182* (2019.01)
*G06F 9/54* (2006.01)
*G06F 11/30* (2006.01)

(52) U.S. Cl.
CPC ........ *G06F 12/0882* (2013.01); *G06F 3/0607* (2013.01); *G06F 3/0665* (2013.01); *G06F 3/0683* (2013.01); *G06F 9/5016* (2013.01); *G06F 9/542* (2013.01); *G06F 9/546* (2013.01); *G06F 11/3034* (2013.01); *G06F 12/0246* (2013.01); *G06F 16/1824* (2019.01); *G06F 16/2246* (2019.01); *G06F 2212/7201* (2013.01)

(58) Field of Classification Search
None
See application file for complete search history.

(56) References Cited

U.S. PATENT DOCUMENTS 5,765,201 A * 6/1998 Manges ................ G06F 3/0607
711/201
5,956,745 A * 9/1999 Bradford ............... G06F 3/0674
711/137

(Continued)

OTHER PUBLICATIONS

Lee et al. "µ-FTL: A Memory-Efficient Flash Translation Layer Supporting Multiple Mapping Granularities." Oct. 2008. ACM. EMSOFT'08. pp. 21-30. (Year: 2008).*

(Continued)

*Primary Examiner* — Nathan Sadler
(74) *Attorney, Agent, or Firm* — BainwoodHuang

(57) ABSTRACT

Host I/O requests directed to a logical storage volume are initially processed by accessing physical pages of non-volatile data storage having a default page size. An indication of an optimal page size for the logical storage volume is received, and the size of the physical pages of non-volatile data storage accessed to process host I/O requests directed to the logical storage volume is changed from the default page size to the optimal page size for the logical storage volume. The default page size is changed to the optimal page size for the logical storage volume by changing a size of physical pages of non-volatile data storage indicated by a mapping structure that maps logical addresses in an address space the logical storage volume to corresponding physical pages of non-volatile data storage from the default page size to the optimal page size for the logical storage volume.

18 Claims, 7 Drawing Sheets

(56) References Cited

U.S. PATENT DOCUMENTS

| | | | |
|---|---|---|---|
| 9,594,918 B1 | 3/2017 | Robinson et al. | |
| 9,934,202 B1 | 4/2018 | Wang et al. | |
| 9,959,058 B1 | 5/2018 | O'Brien et al. | |
| 10,089,032 B1 | 10/2018 | Armangau | |
| 10,860,221 B1 | 12/2020 | Shveidel et al. | |
| 10,866,735 B2* | 12/2020 | Meiri | G06F 3/0653 |
| 11,016,884 B2 | 5/2021 | Soukhman et al. | |
| 11,068,455 B2 | 7/2021 | Shabi et al. | |
| 2014/0082323 A1* | 3/2014 | Li | G06F 12/0246 |
| | | | 711/207 |
| 2019/0236004 A1* | 8/2019 | Bernat | G06F 9/5016 |
| 2020/0379643 A1* | 12/2020 | Muthiah | G06F 3/0659 |
| 2021/0240911 A1* | 8/2021 | Kucherov | G06F 3/061 |

OTHER PUBLICATIONS

Somasundaram et al. Information Storage and Management. 2009. Wiley. pp. 39-41.*

* cited by examiner

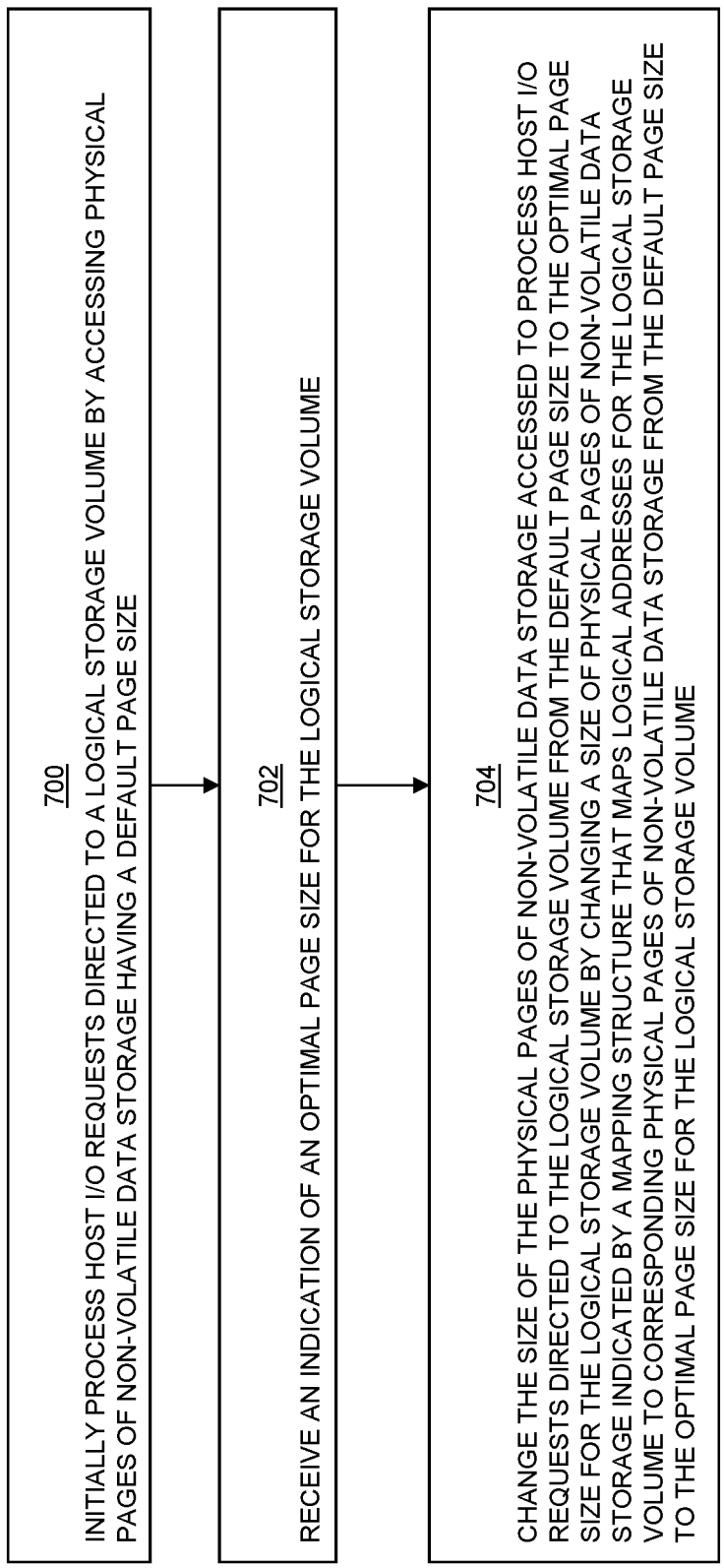

CHANGING PAGE SIZE IN AN ADDRESS-BASED DATA STORAGE SYSTEM

TECHNICAL FIELD

The disclosed technology relates generally to intelligent data storage systems, and more specifically to technology for dynamically changing the page size used in an address-based data storage system.

BACKGROUND

Data storage systems are arrangements of hardware and software that include non-volatile data storage devices (e.g. electronic flash drives, magnetic disk drives, and/or optical drives) that are used to provide non-volatile storage for processing host I/O (Input/Output) requests (i.e. writes and/or reads) that may be received from one or more hosts (e.g. host computers). The host I/O requests that are processed by a data storage system may include block I/O requests as well as file I/O requests. The host I/O requests indicate host data using logical addresses within the logical address space of one or more logical volumes ("logical storage volumes") of non-volatile data storage that are contained in and maintained by the data storage system. The data storage system performs various data storage services that organize and secure host data received from host computers on the non-volatile data storage devices of the data storage system.

SUMMARY

The storage processor of a data storage system processes host I/O requests at least in part by issuing backend I/O operations to the non-volatile data storage devices of the data storage system. The backend I/O operations read host data from and/or write host data to the non-volatile data storage devices, as required to process the host I/O requests. The non-volatile data storage devices may be capable of processing I/O operations with a minimum unit of access of 512 bytes, which is the size of a single SCSI (Small Computer System Interface) block. However, for performance reasons, storage processors are configured to issue backend I/O operations that access non-volatile data storage in the non-volatile data storage devices using units of access that are larger than 512 bytes, referred to as the "page size" that is used to access physical pages of non-volatile data storage located in the non-volatile data storage devices. The page size used by the storage processor to access physical pages in the non-volatile data storage devices is the smallest unit of non-volatile data storage accessed by the storage processor in a backend I/O operation. Accordingly, host data stored in the non-volatile data storage devices can only be read by the storage processor in multiples of the page size used to access the non-volatile data storage devices. Similarly, host data can only be written to the non-volatile data storage devices by the storage processor in multiples of the page size used to access the non-volatile data storage devices.

In previous data storage systems, the page size used to access the non-volatile data storage devices of the data storage system has been inflexible and unmodifiable. The page size was fixed at design time, and subsequently used without adjustment. The use of a statically defined page size only allowed trade-offs between larger and smaller page sizes to be considered at design time.

In general, there are advantages associated with the use of both larger and smaller page sizes. For example, using a larger page size may have the following advantages:

a. Less per-page meta-data required, and less memory consumed to store per-page metadata.

b. Fewer backend I/O operations needed for larger host I/O requests. For example, a 32 KB host I/O read request may be processed using a single backend I/O read operation if the page size is at least 32 KB, but will require multiple backend I/O read operations for smaller page sizes.

c. More efficient RAID (Redundant Array of Independent Disks) calculations (e.g. parity calculations), since the calculations can be performed using larger pages of data.

d. Automatic pre-fetch of proximately stored host data. For example, when using a 32 KB page size, processing of an 8 KB host I/O read request automatically brings an additional 24 KB of nearby host data into cache, and such proximately stored host data is often likely to be read next.

e. Improved data compression efficiency.

On the other hand, using a smaller page size may have the following advantages:

a. Avoiding reading and internally transferring excessive amounts of host data. For example, each 2 KB host I/O read request processed using a 32 KB page size requires that the storage processor read 32 KB from the non-volatile data storage device, and then store the entire 32 KB, and/or calculate a CRC (Cyclic Redundancy Code) on the entire 32 KB of host data in order to validate the host data, even though only 2 KB of host data was needed to satisfy the host I/O read request.

b. Avoiding write amplification when processing smaller host I/O write requests. For example, a large 32 KB page size may result in a single 2 KB host I/O write request requiring the storage processor to read a full 32 KB physical page from the non-volatile data storage device, modify the 32 KB per the 2 KB of host data indicated by the host I/O write request, and then write the entire modified 32 KB page back to the non-volatile data storage devices. In contrast, processing the 2 KB host I/O request using a smaller 2 KB page would advantageously require only reading, modifying, and writing 2 KB of host data.

c. More efficient use of storage processor cache, since the size of cache slots is typically the same size as the page size. For example, processing a 2 KB host I/O read request using a relatively small page size of 2 KB would require updating only a 2 KB cache slot, whereas processing the same size host I/O read request in a system using the larger page size of 32 KB would require updating an entire 32 KB cache slot.

d. Increased deduplication potential when deduplication is performed on a per page basis, since smaller size units of duplicate host data can be identified and removed.

Larger and smaller pages sizes thus each have specific advantages and disadvantages, depending on the specific context. The specific page size that is the best for a storage processor to use when accessing non-volatile data storage devices may accordingly be context specific. For example, different applications issuing host I/O operations may have different I/O profiles, leading to the desirability of the storage processor using different page sizes to access host I/O requests directed to different logical storage volumes. Previous data storage systems were, however, limited to using a single fixed page size at all times for processing host I/O requests directed to all logical storage volumes, and therefore could not optimize the page size dynamically, e.g. in response to specific needs of the applications that consume the non-volatile data storage provided from the non-volatile data storage devices.

To address the above described and other technical shortcomings of previous technologies, the disclosed technology initially processes host I/O requests directed to an individual logical storage volume by accessing physical pages of non-volatile data storage having a default page size. An indication of an optimal page size for the logical storage volume is received, and the size of the physical pages of non-volatile data storage accessed to process host I/O requests directed to the logical storage volume is changed from the default page size to the optimal page size for the logical storage volume. The default page size is changed to the optimal page size for the logical storage volume by changing a size of physical pages of non-volatile data storage indicated by a mapping structure that maps logical addresses for the logical storage volume to corresponding physical pages of non-volatile data storage from the default page size to the optimal page size for the logical storage volume.

For example, the physical pages of non-volatile data storage may be contained in at least one non-volatile data storage device, and processing host I/O requests directed to the logical storage volume may include issuing backend I/O operations to the non-volatile data storage device based on the mapping structure that maps logical addresses for the logical storage volume to corresponding pages of non-volatile data storage.

In another example, the optimal page size for the logical storage volume may be larger than the default page size, and changing the size of the physical pages accessed to process host I/O requests directed to the logical storage volume from the default page size to the optimal page size for the logical storage volume may increase a page size used in the backend I/O operations issued to the non-volatile data storage device to process the host I/O requests directed to the logical storage volume from the default page size to the optimal page size for the logical storage volume.

In another example, the optimal page size for the logical storage volume may be smaller than the default page size, and changing the size of the physical pages accessed to process host I/O requests directed to the logical storage volume from the default page size to the optimal page size for the logical storage volume may decrease a page size used in the backend I/O operations issued to the non-volatile data storage device to process the host I/O requests directed to the logical storage volume from the default page size to the optimal page size for the logical storage volume.

In some embodiments, the mapping data structure may be a mapping tree that represents mappings between logical addresses in an address space of the logical storage volume to corresponding physical pages of non-volatile data storage contained in at least one non-volatile data storage device. In such embodiments, changing the size of physical pages of non-volatile data storage indicated by the mapping structure may include changing a size of physical pages of non-volatile data storage indicated by at least one leaf node in a leaf level of the mapping tree from the default page size to the optimal page size for the logical storage volume.

In some embodiments, each leaf node in the leaf level of the mapping tree may individually include an indication of a size of the physical pages of non-volatile data storage indicated by that leaf node. Changing the size of the physical pages of non-volatile data storage indicated by the mapping structure may further include changing the indication of the size of the physical pages of non-volatile data storage indicated by each leaf node in the mapping tree from the default page size to the optimal page size for the logical storage volume.

Embodiments of the disclosed technology may provide significant improvements over previous technologies. For example, embodiments of the disclosed technology may advantageously support different applications having different I/O profiles by enabling the use of an optimal page size that varies from application to application. For example, a data storage system may operate optimally with regard to providing non-volatile data storage to each one of a database whose optimal page size is 8 KB, a file system whose optimal page size is 32 KB, and a VDI (Virtual Desktop Infrastructure) application whose optimal page size is 1 MB. Each application may consume its own logical storage volume, and the data storage system can accordingly optimize the page size used to access non-volatile data storage for host I/O operations directed to each individual logical storage volume so that the processing of the host I/O operations reflects the I/O profile of the consuming application.

In another example of an advantage that may be provided by embodiments of the disclosed technology, use of application specific page sizes may improve the effectiveness of data reduction techniques. For example, using larger page sizes may be advantageous when performing data compression while providing non-volatile data storage for applications that generate or use data having a high compression ratio. In contrast, using smaller page sizes may be advantageous when performing data deduplication while providing non-volatile data storage for applications that generate or use data for which a high data deduplication rate can be achieved when the deduplication is performed based on a smaller page size.

And in another example of an advantage that may be provided by embodiments of the disclosed technology, automatic configuration of an optimal page size for a logical storage unit advantageously eliminates the need for manual configuration of the page size used by the data storage system on a per application basis.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed on illustrating the principles of various embodiments of the disclosed technology.

FIG. 7 is a flow chart showing an example of steps performed in some embodiments to change the size of physical pages of non-volatile data storage accessed to process host I/O requests directed to a logical storage volume.

DETAILED DESCRIPTION

Embodiments of the invention will now be described. The embodiments described herein are only examples of how features and principles of the invention may be embodied. The invention itself is accordingly broader than the specific examples described below.

The technology disclosed herein initially processes host I/O requests directed to at least one logical storage volume by accessing physical pages of non-volatile data storage having a default page size. The disclosed technology receives an indication of an optimal page size for an individual logical storage volume, and changes the size of the physical pages of non-volatile data storage that are accessed to process host I/O requests directed to that logical storage volume from the default page size to the optimal page size for the logical storage volume. The disclosed technology changes the page size for the logical storage volume from the default page size to the optimal page size for the logical storage volume by changing a size of physical pages of non-volatile data storage indicated by a mapping structure that maps logical addresses in a logical address space for the logical storage volume to corresponding physical pages of non-volatile data storage from the default page size to the optimal page size for the logical storage volume.

Figure 1:
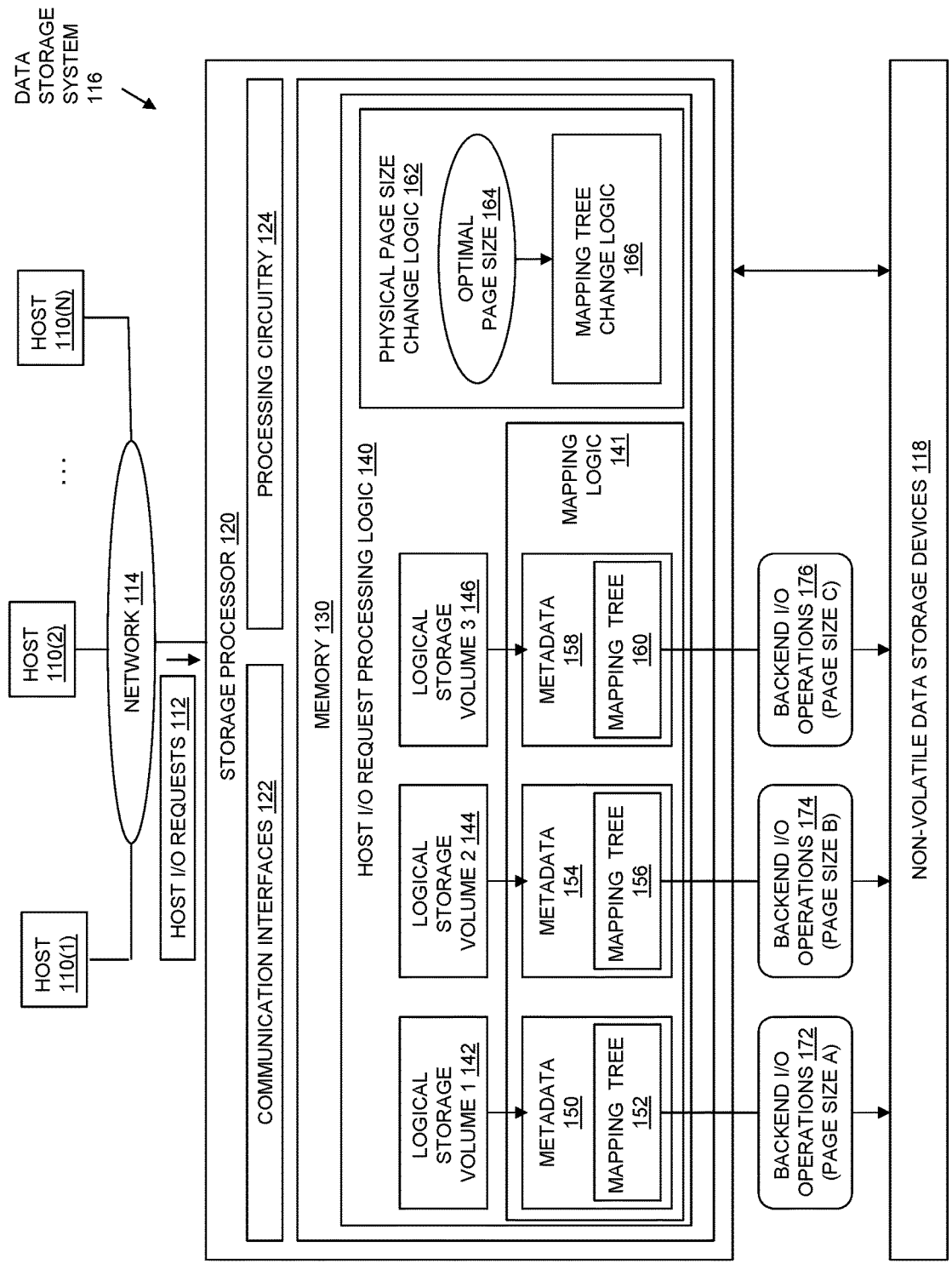
FIG. 1 is a block diagram showing an example of components in some embodiments and an operational environment.

FIG. 1 shows an example of an operational environment in which embodiments of the disclosed technology may operate, and an illustrative embodiment of the disclosed technology. As shown in FIG. 1, one or more physical or virtual host machines ("Hosts"), shown for example as host computers 110(1) through 110(N), and/or host applications executing in whole or in part on host computers 110(1) through 110(N), access non-volatile data storage provided by Data Storage System 116, e.g. over a Network 114. Data Storage System 116 includes at least one Storage Processor 120 and Non-Volatile Data Storage Devices 118. Data Storage System 116 may include one or more storage processors like Storage Processor 120. Storage Processor 120 may be any type of physical or virtual computing device that is capable of processing host I/O requests.

Non-Volatile Data Storage Devices 118 may include or consist of some number of disk drives. The disk drives in Non-Volatile Data Storage Devices 118 may include solid state drives, magnetic disk drives, electronic flash drives, optical drives, and/or other specific types of non-volatile data storage drives or devices. Storage Processor 120 accesses Non-Volatile Data Storage Devices 118 by issuing backend I/O operations (e.g. backend I/O read operations and/or backend I/O write operations, etc.). Each backend I/O operation issued by Storage Processor 120 accesses a number of physical pages of non-volatile data storage (sometimes referred to simply as "pages") located in the Non-Volatile Data Storage Devices 118. The size of the physical pages accessed by a backend I/O operation is referred to as the "physical page size" or "page size". Each backend I/O operation accordingly accesses an amount of non-volatile data storage contained in the Non-Volatile Data Storage Devices 118 that is a multiple of a page size. As further described herein, the disclosed technology enables Storage Processor 120 to access Non-Volatile Data Storage Devices 118 using multiple different page sizes, e.g. on a per-logical storage volume basis, and to dynamically change the page size used to access Non-Volatile Data Storage Devices 118 to process host I/O requests directed to a logical storage unit.

Network 114 may include or consist of any type of network or combination of networks, such as, for example, a local area network (LAN), a wide area network (WAN), the Internet, and/or some other type of network or combination of computer communication networks.

Hosts 110(1-N) and/or host applications executing in whole or in part on Hosts 110(1-N) may logically connect to and communicate with the Storage Processor 120 using various technologies. For example, Host I/O Requests 112 conveyed from Hosts 110(1-N) to Storage Processor 120 may include block I/O requests (read requests and/or write requests) communicated from Hosts 110(1-N) to Storage Processor 120 using block storage interfaces and protocols, and/or file I/O requests (read requests and/or write requests) communicated from Hosts 110(1-N) to the Storage Processor 120 using file storage interfaces and protocols. Storage Processor 120 may accordingly be configured to receive host I/O requests through block-based and/or file-based storage protocols, and to process host I/O requests of either type at least in part by issuing backend I/O operations to the Non-Volatile Data Storage Devices 118.

Storage Processor 120 may include one or more Communication Interfaces 122, Processing Circuitry 124, and Memory 130. The Communication Interfaces 122 of Storage Processor 120 may include, for example, one or more network interface adapters that convert electronic and/or optical signals received over Network 114 into electronic form for use by Storage Processor 120.

Processing Circuitry 124 may, for example, be embodied as at least one microprocessor that is capable of reading and executing program instructions that are stored in Memory 130.

Memory 130 may include both volatile memory (e.g., RAM), and/or non-volatile memory (e.g. ROM, solid state drives, disk drives, etc.). Processing Circuitry 124 and Memory 130 together may form specialized control circuitry that is constructed and arranged to carry out specific methods and functions as described herein. As shown in FIG. 1, Memory 130 stores specialized software components and data structures that may be provided at least in part in the form of executable program instructions. When the executable instructions of the software components shown in FIG. 1 are executed by Processing Circuitry 124, Processing Circuitry 124 performs the methods and functionality of the software. Although certain specific software constructs are shown in FIG. 1 and described herein, those skilled in the art will recognize that Memory 130 may further include various other types of software constructs, which are not shown.

In the example of FIG. 1, the software components in Memory 130 include Host I/O Processing Logic 140, which provides program logic for processing Host I/O Requests 112 received by Storage Processor 120. Host I/O Requests 112 processed by Host I/O Processing Logic 140 may, for example, include host I/O requests (e.g. host I/O read requests, host I/O write requests) that are directed to host accessible data storage objects that are each stored using non-volatile data storage contained within one or more corresponding logical storage volumes provided by Data Storage System 116. Such host accessible data storage objects may, for example, include block based storage objects such as logical disks (e.g. logical units sometimes referred to as LUNs) and/or block-based virtual volumes (VVols), and/or file based storage objects such as files and/or file systems. The logical storage volumes provided by Data Storage System 116 may, for example, include Logical Storage Volume 1 142, Logical Storage Volume 2 144, and Logical Storage Volume 3 146. For purposes of explanation herein, the host I/O requests that are "directed to" a given host accessible data storage object are referred to herein as being "directed to" the corresponding logical storage volume provided by the Data Storage System 116 (e.g. one of Logical Storage Volume 1 142, Logical Storage Volume 2 144, or Logical Storage Volume 3 146) that contains the non-volatile data storage used to store that host accessible data storage object. While three logical storage volumes are shown in the example of FIG. 1, those skilled in the art will recognize that the disclosed technology is not limited to embodiments or configurations providing any specific number of logical storage volumes.

Each logical storage volume may store host data generated by a single corresponding application that generates host I/O requests that are directed to that logical storage volume. Accordingly, Logical Storage Volume 1 142 may store host data generated by a first application that generates host I/O requests directed to Logical Storage Volume 1 142, Logical Storage Volume 2 144 may store host data generated by a second application that generates host I/O requests directed to Logical Storage Volume 2 144, and Logical Storage Volume 3 146 may store host data generated by a third application that generates host I/O requests directed to Logical Storage Volume 3 146.

Host I/O Request Processing Logic 140 may process host I/O requests directed to different logical storage volumes by issuing backend I/O operations to Non-Volatile Data Storage Devices 118 using different physical page sizes. For example, Host I/O Request Processing Logic 140 may process host I/O requests directed to Logical Storage Volume 1 142 at least in part by issuing Backend I/O Operations 172 to Non-Volatile Data Storage Devices 118 using Page Size A. Host I/O Request Processing Logic 140 may also process host I/O requests directed to Logical Storage Volume 2 144 at least in part by issuing Backend I/O Operations 174 to Non-Volatile Data Storage Devices 118 using Page Size B, and may process host I/O requests directed to Logical Storage Volume 3 146 using Page Size C. For example, Page Size A may be an optimal page size dynamically determined by Host I/O Request Processing Logic 140 based on an I/O profile of the application that generates host I/O requests directed to Logical Storage Volume 1 142, Page Size B may be an optimal page size dynamically determined by Host I/O Request Processing Logic 140 based on an I/O profile of the application that generates host I/O requests directed to Logical Storage Volume 2 144, and Page Size C may be an optimal page size dynamically determined by Host I/O Request Processing Logic 140 based on an I/O profile of the application that generates host I/O requests directed to Logical Storage Volume 3 146.

Within Host I/O Processing Logic 140, Mapping Logic 141 operates to determine the locations of physical pages of non-volatile data storage in Non-Volatile Data Storage Devices 118 that correspond to logical storage volume-specific logical addresses that are used in the Host I/O Requests 112. Mapping Logic 141 includes metadata for each logical storage volume, shown by Metadata 150 for Logical Storage Volume 1 142, Metadata 154 for Logical Storage Volume 2 144, and Metadata 158 for Logical Storage Volume 3 146. The metadata for each logical storage volume includes a mapping tree used by Mapping Logic 141 to map logical addresses in the address space of the corresponding logical storage volume to physical pages of non-volatile data storage in Non-Volatile Data Storage Devices 118. Metadata 150 includes Mapping Tree 152, Metadata 154 includes Mapping Tree 156, and Metadata 158 includes Mapping Tree 160.

For each host I/O request in Host I/O Requests 112, Host I/O Request Processing Logic 140 uses Mapping Logic 141 to traverse the mapping tree corresponding to the logical storage volume indicated by the request based on a logical address indicated by the request. The logical address indicated by the request may, for example, be a logical block address (LBA) within a logical address space of a logical storage volume to which the request is directed. Traversal of the mapping tree based on the logical address enables the Host I/O Request Processing Logic 140 to identify the physical page of non-volatile data storage in Non-Volatile Data Storage Devices 118 that corresponds to the logical address. For example, Mapping Tree 152 may map individual LBAs within the logical address space of Logical Storage Volume 1 142 to corresponding physical pages of non-volatile storage that are used to store host data written to Logical Storage Volume 1 142, Mapping Tree 156 may map individual LBAs within the logical address space of Logical Storage Volume 2 144 to corresponding physical pages of non-volatile storage that are used to store host data written to Logical Storage Volume 2 144, and Mapping Tree 160 may map individual LBAs within the logical address space of Logical Storage Volume 3 146 to corresponding physical pages of non-volatile storage that are used to store host data written to Logical Storage Volume 3 146.

In some embodiments, some or all of each mapping tree may be made up of or include a B-tree, which is an example of a self-balancing tree data structure.

Each mapping tree may be embodied with multiple levels of nodes, including upper levels, a leaf level under the upper levels, a virtual block layer under the leaf level, and a physical block layer under the virtual block layer. Each node in a mapping tree above the physical block layer contains pointers to nodes located in a next lower level. For example, the upper levels of a mapping tree may include a top level ("Level 1"), in which each node contains pointers to nodes in the next lower level, e.g. "Level 2". Similarly, each node in "Level 2" of the mapping tree may contain pointers to nodes in "Level 3" of the mapping tree, and so on for any further upper levels.

The level of nodes below the upper levels of a mapping tree is the leaf level. The leaf level of a mapping tree contains leaf nodes. Each leaf node in a mapping tree may map a corresponding segment within the logical address space of the corresponding logical storage volume (e.g. a range of LBAs) to pointers located in virtual blocks in the virtual block layer. Accordingly, each leaf node may contain pointers, each of which points to a pointer that is located in a virtual block. In some embodiments, each virtual block in the virtual block layer may correspond to a physical block of contiguous non-volatile data storage in Non-Volatile Data Storage Devices 118, and contain pointers to physical pages of non-volatile data storage located within the physical block. The physical block layer is located below the virtual block layer, and contains physical blocks, each of which may correspond to one virtual block or be shared by multiple virtual blocks. Each physical block is a physically contiguous chunk of non-volatile data storage in Non-Volatile Data Storage Devices 118, and contains some number of physical pages of non-volatile data storage. The size of the pages in the physical blocks of a mapping tree is the page size of the corresponding logical storage volume that is used when issuing backend I/O operations when processing host I/O requests directed to the corresponding logical storage volume. Because each pointer in a leaf node of a mapping tree indicates, via a pointer in a virtual block, a single page in a physical block of the mapping tree, the size of the pages indicated by the pointers in a leaf node is also the page size used when issuing backend I/O operations when processing host I/O requests directed to the corresponding logical storage volume.

For example, because the size of the pages in the physical blocks of Mapping Tree 152 is Page Size A, the size of the pages indicated by the pointers in the leaf nodes of Mapping Tree 152 (via pointers in the virtual blocks of Mapping Tree 152) is Page Size A, and the page size used by Backend I/O operations 172 is also Page Size A. Similarly, because the size of the pages in the physical blocks of Mapping Tree 156 is Page Size B, the size of the pages indicated by the pointers in the leaf nodes of Mapping Tree 156 (via pointers in the virtual blocks of Mapping Tree 156) is Page Size B, and the page size used by Backend I/O operations 174 is also Page Size B. And because the size of the pages in the physical blocks of Mapping Tree 160 is Page Size C, the size of the pages indicated by the pointers in the leaf nodes of Mapping Tree 160 (via pointers in the virtual blocks of Mapping Tree 160) is Page Size C, and the page size used by Backend I/O operations 174 is also Page Size C.

It is therefore apparent that by changing the size of the pages indicated by the pointers in the leaf nodes of a mapping tree, embodiments of the disclosed technology can change the page size used in the backend I/O operations that are performed while processing host I/O requests directed to the logical storage volume corresponding to the mapping tree. Accordingly, by changing the size of the pages indicated by the pointers in the leaf nodes of Mapping Tree 152, embodiments of the disclosed technology may change the page size used in Backend I/O Operations 172. Similarly, by changing the size of the pages indicated by the pointers in the leaf nodes of Mapping Tree 156, embodiments of the disclosed technology may change the page size used in Backend I/O Operations 174. And by changing the size of the pages indicated by the pointers in the leaf nodes of Mapping Tree 160, the disclosed technology may change the page size used in Backend I/O Operations 176.

In some embodiments, a default page size (e.g. 4 KB) may be initially used for processing host I/O requests directed to one or more of the logical storage volumes in Data Storage System 116. For example, each one of the mapping trees for Logical Storage Volume 1 142, Logical Storage Volume 2 144, and Logical Storage Volume 3 146 may initially contain leaf nodes with pointers indicating pages having a size equal to the default page size. Accordingly, all backend I/O operations generated by Storage Processor 120 to Non-Volatile Data Storage Devices 118 may initially use such a default page size.

For example, because the size of the pages in the physical blocks of Mapping Tree 152 is Page Size A, the size of the pages indicated by the pointers in the leaf nodes of Mapping Tree 152 (via pointers in the virtual blocks of Mapping Tree 152) is Page Size A, and the page size used by Backend I/O operations 172 is also Page Size A. Similarly, because the size of the pages in the physical blocks of Mapping Tree 156 is Page Size B, the size of the pages indicated by the pointers in the leaf nodes of Mapping Tree 156 (via pointers in the virtual blocks of Mapping Tree 156) is Page Size B, and the page size used by Backend I/O operations 174 is also Page Size B. And because the size of the pages in the physical blocks of Mapping Tree 160 is Page Size C, the size of the pages indicated by the pointers in the leaf nodes of Mapping Tree 160 (via pointers in the virtual blocks of Mapping Tree 160) is Page Size C, and the page size used by Backend I/O operations 176 is also Page Size C.

For example, if during the observation time period the vast majority of host I/O requests (e.g. reads and writes) directed to Logical Storage Volume 1 142 are 8 KB and random in their logical locations within the logical address space of Logical Storage Volume 1 142 (as, for example, may be typical for a database application), Host I/O Request Processing Logic 140 may calculate an Optimal Page Size 164 for Logical Storage Volume 1 142 of 8 KB.

In another example, in the case where host I/O requests directed to a logical storage volume are mostly sequential in their locations within the logical address space, and have a mix of I/O sizes, e.g. 8 KB, 16 KB and 32 KB, Host I/O Request Processing Logic 140 may calculate an optimal page size for the logical storage volume of 32 KB.

The specific value of Optimal Page Size 164 may further reflect selection of an optimal page size from a set of available page sizes that are supported by a specific embodiment of Data Storage System 116. For example, in the case where an embodiment of Data Storage System 116 does not support 32 KB page sizes, but does support 64 KB page sizes, the optimal page size for the logical storage volume may not be settable to 32 KB, and the optimal page size may instead have to be set to 64 KB instead of 32 KB.

Those skilled in the art will recognize that various specific optimal page sizes may be calculated and used, and that the disclosed technology is not limited to use with any specific optimal or default page size.

In response to receipt of Optimal Page Size 164 for Logical Storage Volume 1 142, Physical Page Size Change Logic 162 may change the size of the physical pages of non-volatile data storage that are accessed to process host I/O requests directed to Logical Storage Volume 1 142 from the default page size to Optimal Page Size 164. For example, Mapping Tree Change Logic 166 in Physical Page Size Change Logic 162 may change the page size used in the Backend I/O Operations 172 (e.g. Page Size A) that are issued by Storage Processor 120 when Host I/O Request Processing Logic 140 processes host I/O requests directed to Logical Storage Volume 1 142 from the default page size to Optimal Page Size 164, e.g. by changing a size of the physical pages of non-volatile data storage indicated by a mapping structure for Logical Storage Volume 1 142 (e.g. Mapping Tree 152) from the default page size to Optimal Page Size 164.

For example, Optimal Page Size 164 for Logical Storage Volume 1 142 may be larger than a default page size for Logical Storage Volume 1 142 and initially used by Backend I/O Operations 172 while processing host I/O requests directed to Logical Storage Volume 1 172. In such a case, Physical Page Size Change Logic 162 may change size of the physical pages accessed while Host I/O Request Processing Logic 140 processes host I/O requests directed to Logical Storage Volume 1 142 from the default page size to Optimal Page Size 164 by increasing the page size used in Backend I/O Operations 172 (e.g. Page Size A) from the default page size to Optimal Page Size 164, e.g. by increasing the size of the physical pages of non-volatile data storage indicated by a mapping structure such as Mapping Tree 152 from the default page size to Optimal Page Size 164.

In another example, Optimal Page Size 164 for Logical Storage Volume 1 142 may be smaller than a default page size for Logical Storage Volume 1 142 initially used in Backend I/O Operations 172 while processing host I/O requests directed to Logical Storage Volume 1 172. In such a case, Physical Page Size Change Logic 162 may change the size of the physical pages accessed while Host I/O Request Processing Logic 140 processes host I/O requests directed to Logical Storage Volume 1 142 from the default page size to Optimal Page Size 164 by decreasing the page size used in Backend I/O Operations 172 (e.g. Page Size A) from the default page size to the Optimal Page Size 164, e.g. by decreasing the size of the physical pages of non-volatile data storage indicated by a mapping structure such as Mapping Tree 152 from the default page size to Optimal Page Size 164.

In some embodiments, Mapping Tree Change Logic 166 may change the size of the physical pages of non-volatile data storage indicated by a mapping structure such as Mapping Tree 152 by changing the size of the physical pages of non-volatile data storage indicated by the leaf nodes in a leaf level of Mapping Tree 152 from the default page size to the optimal page size for the logical storage volume.

In some embodiments, each leaf node in the leaf level of each mapping tree may individually include an indication of the size of the physical pages of non-volatile data storage indicated by that leaf node. In such embodiments, changing the size of the physical pages of non-volatile data storage indicated by a mapping structure such as Mapping Tree 152 by Mapping Tree Change Logic 166 may further include changing the indication of the size of the physical pages of non-volatile data storage indicated by each leaf node in Mapping Tree 152 from the default page size to Optimal Page Size 164.

While the above description references changing the page size for Logical Storage Volume 1 142 that is used for issuing backend I/O operations to Non-Volatile Data Storage Devices 118 while processing host I/O requests directed to Logical Storage Volume 1 142, the page size for other logical storage volumes provided by Data Storage System 116 may also be changed. For example, the page size for Logical Storage Volume 2 144 that is used for issuing backend I/O operations to Non-Volatile Data Storage Devices 118 while processing host I/O requests directed to Logical Storage Volume 2 144 may be independently changed to an optimal page size for Logical Storage Volume 2 144. Similarly, the page size for Logical Storage Volume 3 146 that is used for issuing backend I/O operations to Non-Volatile Data Storage Devices 118 while processing host I/O requests directed to Logical Storage Volume 3 146 may also independently be changed to an optimal page size for Logical Storage Volume 3 146.

Figure 2:
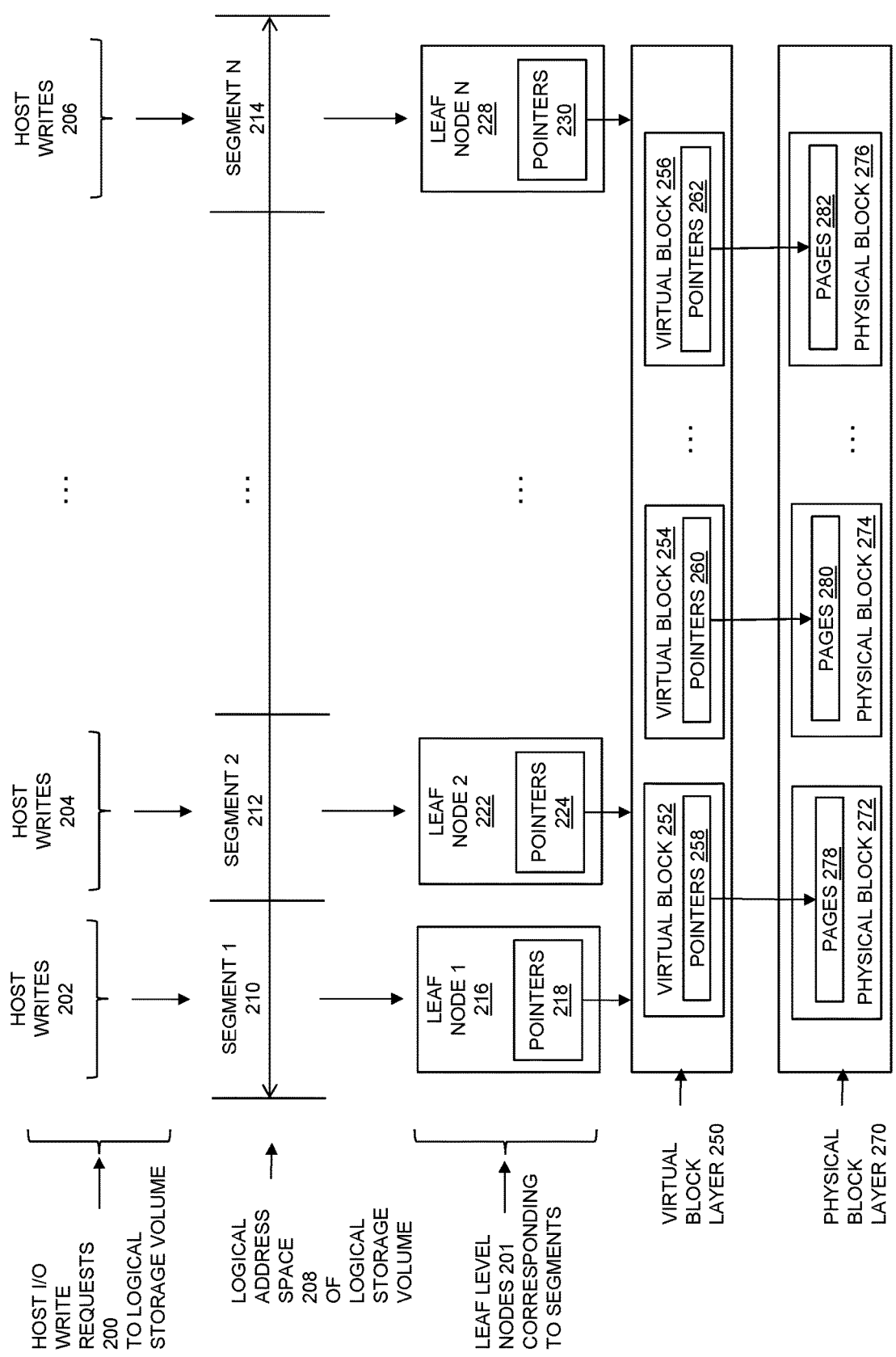
FIG. 2 is a block diagram showing an example of some components in a mapping tree for a logical storage volume in some embodiments.

FIG. 2 is a block diagram showing an example of segments in a Logical Address Space 208 of a logical storage volume, and of the corresponding Leaf Level Nodes 201 in a mapping tree for the logical storage volume. As shown in FIG. 2, Logical Address Space 208 may be divided into segments, shown by Segment 1 210, Segment 2 212, and so on through Segment N 214. The disclosed technology may be embodied using any specific length of logical address space, and using various specific sizes of segments within the logical address space. For example, each segment within the Logical Address Space 208 may have a size of 2 MB. For example, if the page size for the logical storage volume has been dynamically configured by the disclosed technology to be 4 KB, each leaf node may store up to 512 pointers, each one of which indicates a 4 KB physical page by pointing to a pointer in a virtual block that points to a 4 KB page of non-volatile data storage within a physical block. In another example, if the page size for the logical storage volume has been dynamically configured to be 8 KB, each leaf node may store up to 256 pointers, each one of which indicates an 8 KB physical page by pointing to a pointer in a virtual block that points to an 8 KB page of non-volatile data storage within a physical block. In another example, if the page size for the logical storage volume has been dynamically configured to be 16 KB, each leaf node may store up to 128 pointers, each one of which indicates a 16 KB physical page by pointing to a pointer in a virtual block that points to a 16 KB page of non-volatile data storage within a physical block. Those skilled in the art will recognize that the specific segment size and the specific page sizes given above are only examples, and that the disclosed technology is not limited to the use of any specific segment and/or page sizes.

In the example of FIG. 2, Leaf Node 1 216 corresponds to Segment 1 210, Leaf Node 2 222 corresponds to Segment 2 212, and so on through Leaf Node N 228, which corresponds to Segment N 214.

Each leaf node in the Leaf Level Nodes 201 contains pointers that individually point to pointers that are contained in one or more of the virtual blocks in the Virtual Block Layer 250. Virtual Block Layer 250 includes some number of virtual blocks, shown for purposes of illustration by Virtual Block 252 (containing Pointers 258), Virtual Block 254 (containing Pointers 260), and so on through Virtual Block 256 (containing Pointers 262). Physical Layer 270 includes some number of physical blocks, shown for purposes of illustration by Physical Block 272, Physical Block 274, and so on through Physical Block 276. Each physical block in Physical Layer 270 is a is a physically contiguous chunk of non-volatile data storage that may be used to store host data written by Host I/O Write Requests 200 to the logical storage volume, and is made up of pages indicated by pointers in the virtual blocks of the Virtual Block Layer 250. For example, Physical Block 272 is made up of Pages 278, Physical Block 274 is made up of Pages 280, and so on through Physical Block 276, which is made up of Pages 282.

Each virtual block in Virtual Block Layer 250 contains pointers pointing to individual pages in one of the physical blocks in Physical Layer 270. In some embodiments, a single physical block may be shared by multiple virtual blocks, and thus be pointed to by the pointers contained in the multiple virtual blocks. In the example of FIG. 2, pointers in Virtual Block 252 point to individual pages in Physical Block 272, pointers in Virtual Block 254 point to individual pages in Physical Block 274, and so on, through Virtual Block 256, which contains pointers that point to individual pages in Physical Block 276. Each pointer in a virtual block points to a page of non-volatile storage that is used to store host data written to the segment or segments of the logical address space that correspond to one or more leaf nodes that include pointers to that pointer. Accordingly, Leaf Node 1 216 contains Pointers 218 that point to pointers in the virtual blocks of Virtual Block Layer 250 that point to pages in Physical Layer 270 that store host data indicated by Host Writes 202, because Host Writes 202 are directed to logical addresses (e.g. logical block addresses sometimes referred to as "LBAs") that fall within Segment 1 210. Leaf Node 2 222 contains Pointers 224 that point to pointers in the virtual blocks of Virtual Block Layer 250 that point to pages in Physical Layer 270 that store host data indicated by Host Writes 204, because Host Writes 204 are directed to logical addresses (e.g. "LBAs") that fall within Segment 2 212. The Leaf Level Nodes 201 continue on similarly through Leaf Node N 228, which contains Pointers 230 that point to pointers in the virtual blocks of Virtual Block Layer 250 that point to pages in Physical Layer 270 that store host data indicated by Host Writes 206, because Host Writes 206 are directed to logical addresses (e.g. "LBAs") that fall within Segment N 214.

The pointers in a given leaf node may, for example, be arranged sequentially, in correspondence with an order of LBAs within the corresponding segment of the logical address space. For example, a first pointer in Pointers 218 may point to a pointer to a page of non-volatile storage that is used to store the host data indicated by write operations directed to a first LBA within Segment 1 210 (e.g. the lowest LBA in the segment), a second pointer in Pointers 218 may point to a pointer to a page of non-volatile storage that is used to store the host data indicated by write operations directed to a second LBA within Segment 1 210 (e.g. the second lowest LBA in the segment), and so on.

Figure 3:
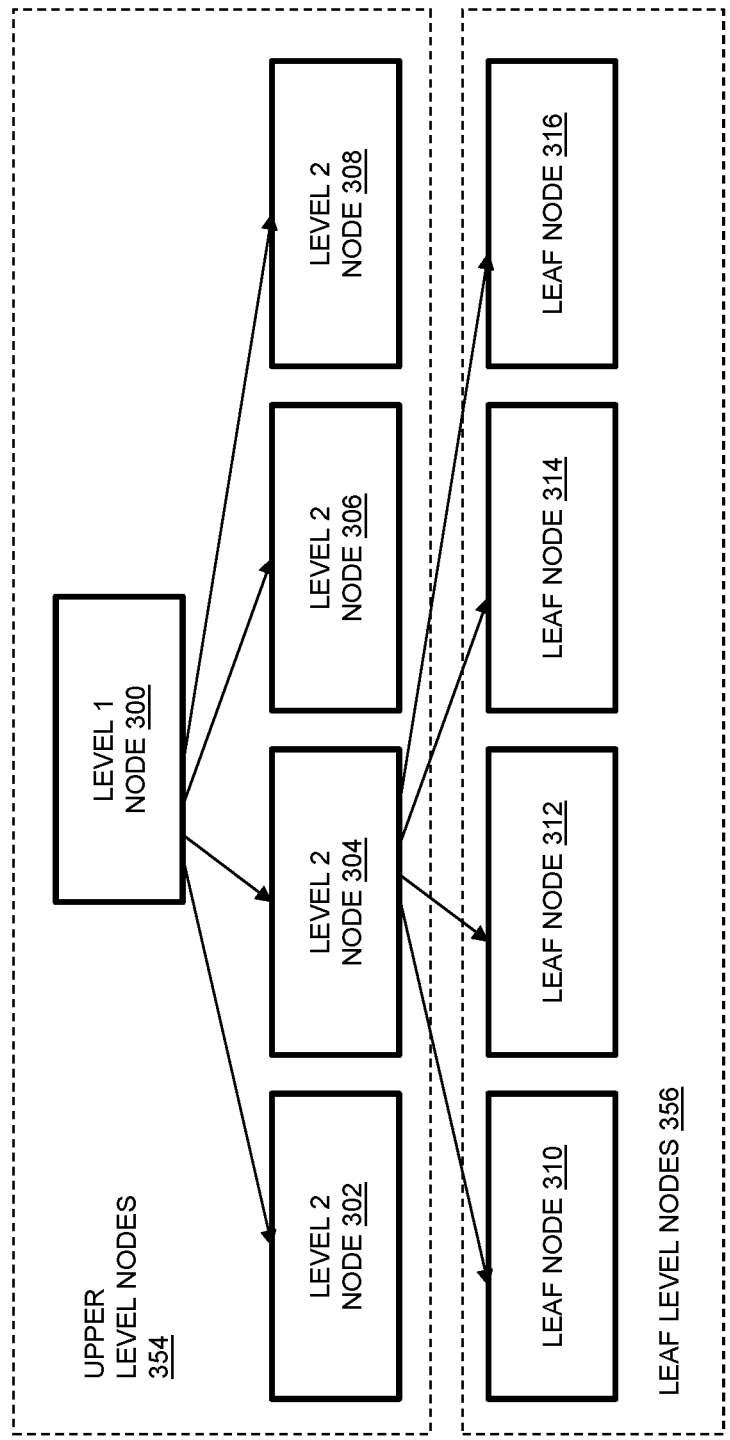
FIG. 3 is a block diagram showing an example of some components in a mapping tree in some embodiments.

FIG. 3 is a block diagram showing the upper level nodes and leaf level nodes in a simplified example of a mapping tree in some embodiments. In the example of FIG. 3, the Upper Level Nodes 354 include two levels: a first level (also referred to as "level 1"), and a second level (also referred to as "level 2"). The first level is shown including a Level 1 Node 300. The second level is shown including Level 2 Node 302, Level 2 Node 304, Level 2 Node 306, and Level 2 Node 308. The Leaf Level Nodes 356 include Leaf Node 310, Leaf Node 312, Leaf Node 314, and Leaf Node 316.

In some embodiments, each level 1 node represents 512 GB of logical address space, each level 2 node represents 1 GB of logical address space, and each leaf node represents 2 MB of logical address space. Each node in level 1, level 2, and the leaf level may, for example, have a size of 4 KB, and store up to a maximum of 512 pointers to nodes at the next lower level. Accordingly, in such embodiments, each level 1 node may contain pointers to a maximum of 512 level 2 nodes, and each level 2 node may contain pointers to a maximum of 512 leaf nodes.

Each leaf node in Leaf Level Nodes 356 contains pointers to pointers to pages of non-volatile storage. For example, each leaf node in Leaf Level Nodes 356 may contain a maximum of 512 pointers to pointers (e.g. located within virtual blocks in a virtual block layer as shown in FIG. 2) to pages of non-volatile storage (e.g. located within physical blocks in a physical block layer as shown in FIG. 2) that are used to store host data written to the segment of the logical address space corresponding to that leaf node.

In some embodiments, the size of the nodes in the mapping tree may be fixed, and remain constant across modifications to the page size for the corresponding logical storage volume. In such embodiments, the minimum page size for a logical storage volume may be dependent on the maximum number of pointers that can be stored within a leaf node within the mapping tree.

In other embodiments, the size of the nodes in one or more levels of the mapping tree may be modifiable, and may be adjusted in response to modifications to the page size for the corresponding logical storage volume in order to optimize the size of the mapping tree. In such embodiments, the size of nodes within one or more levels of the mapping tree may be decreased when using larger page sizes, in order to lower the total amount of metadata required to store the mapping tree. Also in such embodiments, smaller minimum page sizes may be supported since the size of the nodes in one or more levels of the mapping tree may potentially be increased, and thereby store larger numbers of pointers per node so that relatively smaller page sizes can be supported.

Figure 4:
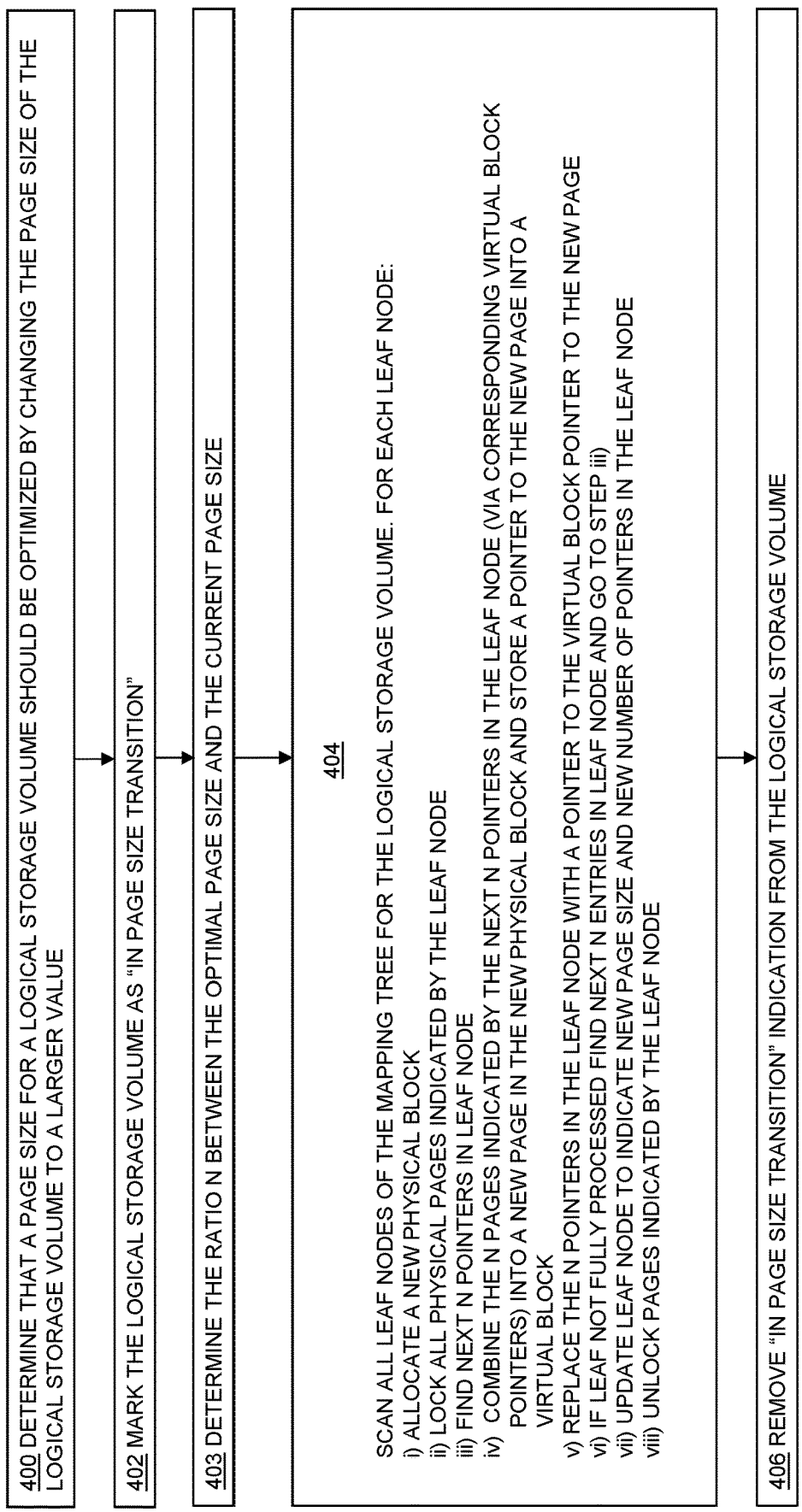
FIG. 4 is a flow chart showing an example of steps performed in some embodiments to increase the size of physical pages of non-volatile data storage accessed to process host I/O requests directed to a logical storage volume by modifying indications of physical pages in leaf nodes of a mapping tree.

FIG. 4 is a flow chart showing an example of steps performed in some embodiments to increase the page size for a logical storage volume to increase the size of physical pages of non-volatile data storage accessed to process host I/O requests directed to the logical storage volume by modifying indications of physical pages in leaf nodes of a mapping tree corresponding to the logical storage volume.

At step 400, Physical Page Size Change Logic 162 determines that the page size for the logical storage volume should be optimized by changing the page size of the logical volume from a current page size (e.g. a relatively smaller default page size) to a larger value (e.g. a relatively larger Optimal Page Size 164). At step 402, Physical Page Size Change Logic 162 marks the logical storage volume as "IN PAGE SIZE TRANSITION", e.g. by modifying a current state of the logical storage volume in metadata of the storage volume. The "IN PAGE SIZE TRANSITION" state indicates that the logical storage volume may currently have a mixture of different page sizes.

At step 403, Physical Page Size Change Logic 162 determines the ratio N between the optimal page size and the current page size. For example, the current page size for the virtual volume may be S1, and Optimal Page Size 164 for the logical volume may be a multiple of the current page size, e.g. S2, such that the ratio S2/S1 is a whole number N.

At step 404, Physical Page Size Change Logic 162 (e.g. Mapping Tree Change Logic 166) scans all leaf nodes in the mapping tree for the logical storage volume. For each leaf node in the mapping tree, the following steps are performed:

i) A new physical block is allocated to store pages of the Optimal Page Size 164 that are indicated by the leaf node.

ii) All physical pages indicated by the leaf node are locked (e.g. the leaf node is locked until all after all pages indicated by the leaf node have been changed to pages of the Optimal Page Size 164).

iii) The next N pointers in the leaf node are located that indicate pages of the current page size.

iv) The next N pointers in the leaf node located in step iii) are used to obtain the N pointers in one or more virtual blocks that they point to, in order to locate the N physical pages of the current block size in physical blocks that are pointed to by those virtual block pointers. The N pages of the current page size indicated by the leaf node are combined into a single page of Optimal Page Size 164 within the newly allocated physical block. At the time that the N pages of the current page size are combined into the single page of Optimal Page Size 164, data reduction operations such as compression and/or data deduplication may be performed on the host data. A pointer to the newly created page of Optimal Page Size 164 may then be stored into a virtual block.

v) The N pointers in the leaf node located at step iii) are replaced in the leaf node by a single pointer indicating the newly created page of Optimal Page Size 164, e.g. by replacing the N pointers in the leaf node that were located at step iii) with a pointer to the pointer pointing to the newly created page of Optimal Page Size 164 that was previously stored into a virtual block in step iv)

vi) If all the pointers in the leaf node pointing to pages of the current page size have not been processed, then go back to step iii)

vii) After all the pointers in the leaf node pointing to pages of the current page size have been processed, update the leaf node to indicate that the pages indicated by the leaf node have a size equal to Optimal Page Size 164, and to also indicate the total number of pointers in the leaf node.

viii) After the leaf node has been updated to indicate that pages indicated by the leaf node have a size equal to Optimal Page Size 164, and also to indicate the total number of pointers contained in the leaf node, all physical pages indicated by the leaf node are unlocked.

At step 406, after all leaf nodes have been processed, Physical Page Size Change Logic 162 removes the indication of "IN PAGE SIZE TRANSITION" from the storage volume, e.g. by modifying a current state of the logical storage volume in metadata of the storage volume. By removing the "IN PAGE SIZE TRANSITION" indication, Physical Page Change Logic 162 indicates that the logical storage volume no longer has a mixture of different page sizes.

Figure 5:
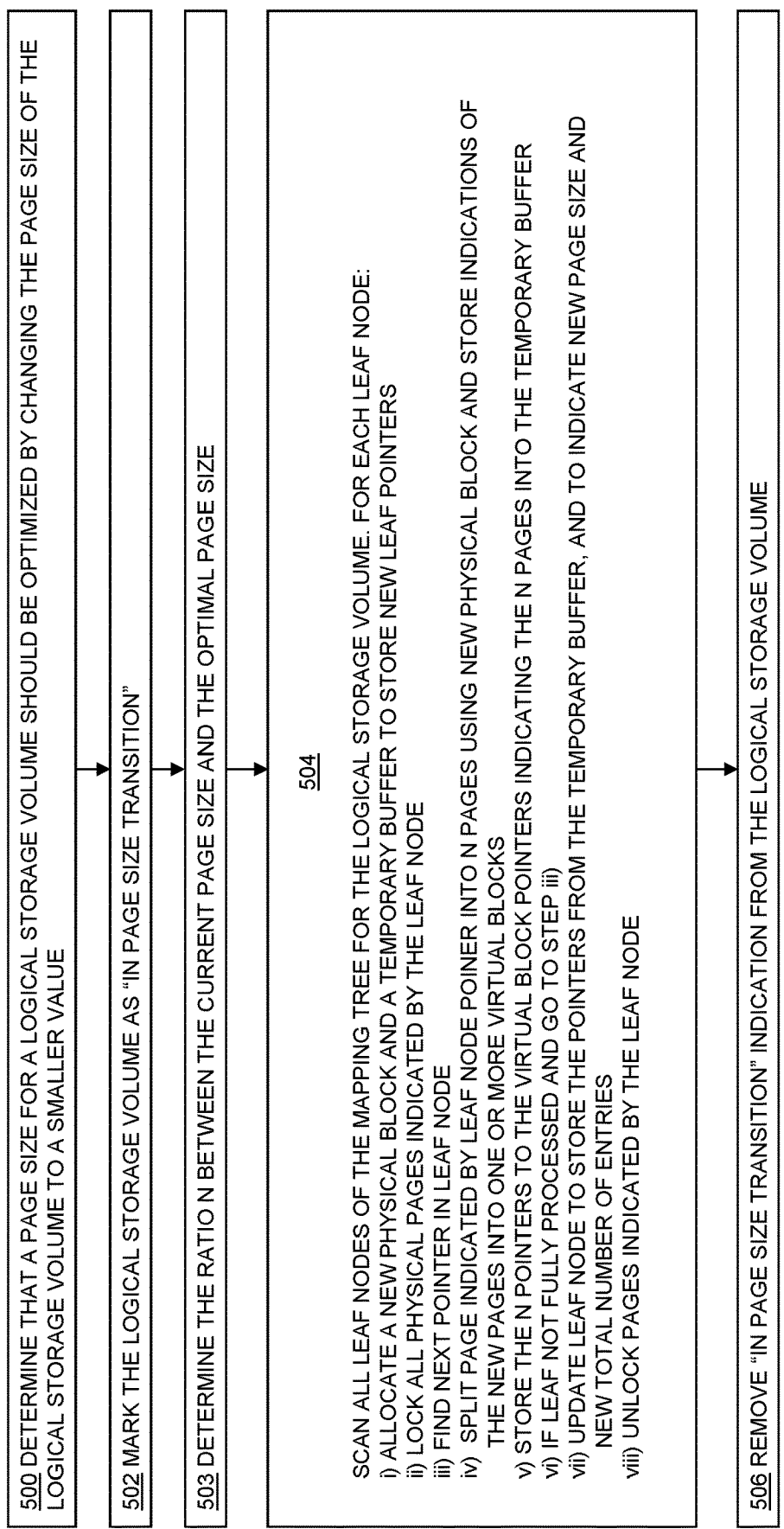
FIG. 5 is a flow chart showing an example of steps performed in some embodiments to decrease the size of physical pages of non-volatile data storage accessed to process host I/O requests directed to a logical storage volume by modifying indications of physical pages in leaf nodes of a mapping tree.

FIG. 5 is a flow chart showing an example of steps performed in some embodiments to decrease the page size for a logical storage volume to decrease the size of physical pages of non-volatile data storage accessed to process host I/O requests directed to the logical storage volume by modifying indications of physical pages in leaf nodes of a mapping tree corresponding to the logical storage volume.

At step 500, Physical Page Size Change Logic 162 determines that the page size for the logical storage volume should be optimized by changing the page size of the logical volume from a current page size (e.g. a relatively larger default page size) to a smaller value (e.g. a relatively smaller Optimal Page Size 164).

At step 502, Physical Page Size Change Logic 162 marks the logical storage volume as "IN PAGE SIZE TRANSITION", e.g. by modifying a current state of the logical storage volume in metadata of the storage volume. The "IN PAGE SIZE TRANSITION" state indicates that the logical storage volume may currently have a mixture of different page sizes.

At step 503, Physical Page Size Change Logic 162 determines the ratio N between the current page size and the optimal page size. For example, the Optimal Page Size 164 for the virtual volume may be S2, and the current page size for the logical volume may be a multiple of the Optimal Page 164, e.g. S1, such that the ratio S1/S2 is a whole number N.

At step 504, Physical Page Size Change Logic 162 (e.g. Mapping Tree Change Logic 166) scans all leaf nodes in the mapping tree for the logical storage volume. For each leaf node in the mapping tree, the following steps are performed:

i) A new physical block is allocated to store pages of the Optimal Page Size 164 that are indicated by the leaf node, and a temporary buffer is allocated to temporarily store new leaf pointers indicating the pages of Optimal Page Size 164.

ii) All physical pages indicated by the leaf node are locked (e.g. the leaf node is locked until all after all pages indicated by the leaf node have been changed to pages of the Optimal Page Size 164).

iii) The next pointer in the leaf node is located that indicates a page of the current page size.

iv) The page indicated by the pointer located in step iii) is split into N new pages of Optimal Page Size 164, and those N new pages of Optimal Page Size 164 are stored in the new physical block. N pointers to the N new pages of Optimal Page Size 164 within the new physical block are then stored in one or more virtual blocks.

v) N pointers (e.g. new leaf pointers) to the N pointers in the virtual blocks are then stored in the temporary buffer. At the time that the page of the current page size is split into N new pages of Optimal Page Size 164 and stored in the new physical block, data reduction operations such as compression and/or data deduplication may be performed on the host data.

vi) If all the pointers in the leaf node pointing to pages of the current page size have not been processed, then go back to step iii)

vii) After all the pointers in the leaf node pointing to pages of the current page size have been processed, replace the pointers in the leaf node with the pointers stored in the temporary buffer, and update the leaf node to indicate that the pages indicated by the leaf node have a size equal to Optimal Page Size 164 and to also indicate the total number of pointers in the leaf node.

viii) After the leaf node has been updated to indicate that pages indicated by the leaf node have a size equal to Optimal Page Size 164, and also to indicate the total number of pointers contained in the leaf node, all physical pages indicated by the leaf node are unlocked.

At step 506, after all leaf nodes have been completely processed, Physical Page Size Change Logic 162 removes the indication of "IN PAGE SIZE TRANSITION" from the storage volume, e.g. by modifying a current state of the logical storage volume in metadata of the storage volume. By removing the "IN PAGE SIZE TRANSITION" indication, Physical Page Change Logic 162 indicates that the logical storage volume no longer has a mixture of different page sizes.

Figure 6:
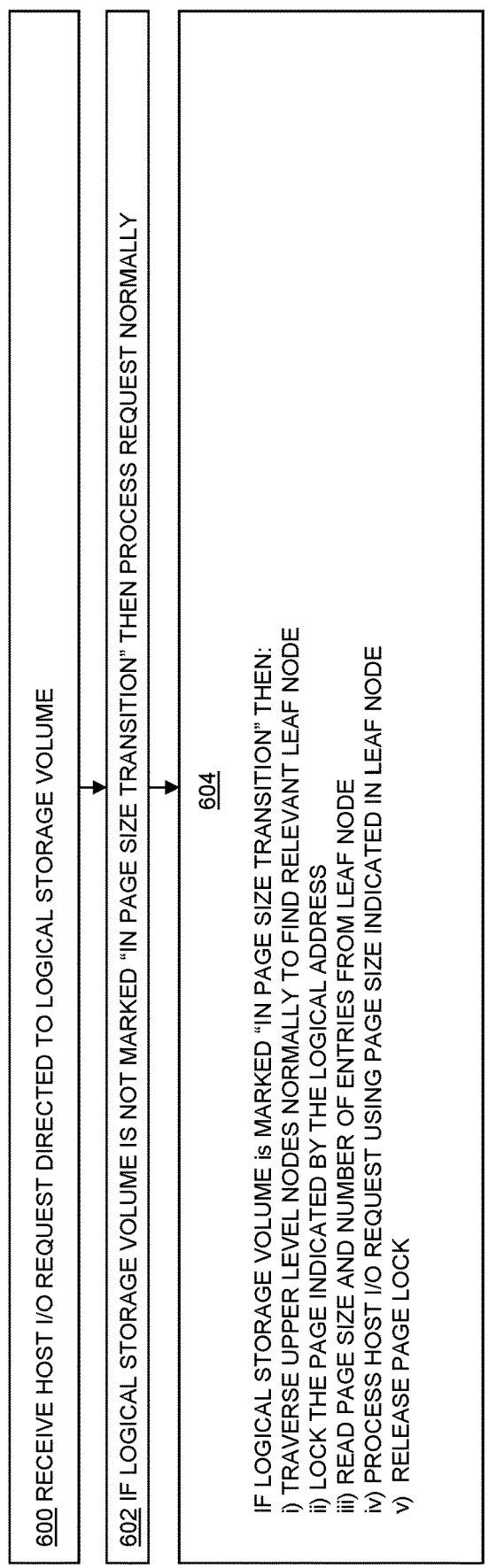
FIG. 6 is a flow chart showing an example of steps performed in some embodiments to process host I/O requests while accommodating dynamic physical page size changes.

FIG. 6 is a flow chart showing an example of steps performed in some embodiments to process host I/O requests while accommodating dynamic physical page size changes. The steps of FIG. 6 may, for example, be performed by Host I/O Request Processing Logic 140 simultaneously with the changing of one or more pages sizes for one or more of the logical storage volumes provided by Data Storage System 116.

At step 600, Host I/O Request Processing Logic 140 receives a host I/O request (e.g. read or write request) directed to a logical storage volume.

At step 602, Host I/O Request Processing Logic 140 determines whether the logical storage volume is currently marked "IN PAGE SIZE TRANSITION". If not, then the logical storage volume does not have a mixture of different page sizes, and the pages indicated by all the leaf nodes in the corresponding mapping tree are all the same size, and Host I/O Request Processing Logic 140 can process the host I/O request normally, without locking the page corresponding to the logical address before determining from the relevant leaf node the page size to be used while processing the host I/O request.

Otherwise, if the logical storage volume is marked "IN PAGE SIZE TRANSITION", then at step 604 Host I/O Request Processing Logic 140 performs the following steps to perform the host I/O request:

i) Host I/O Processing Logic 140 first traverses the upper levels of the mapping tree for the logical storage volume based on the logical address indicated by the host I/O request to find the leaf node corresponding to the logical address.

ii) Before proceeding further, Host I/O Processing Logic 140 must then obtain a lock on the page corresponding to the logical address. If the page size is being changed for the relevant leaf node, e.g. by Mapping Tree Change Logic 166, Host I/O Processing Logic 140 must wait until Mapping Tree Change Logic 166 completes the process of changing the page size for that leaf node, and releases the lock on the page corresponding to the logical address.

iii) After obtaining the lock on the page corresponding to the logical address, Host I/O Processing Logic 140 reads the page size indicated by the leaf node corresponding to the logical address, and the indication of the total number of entries in the leaf node.

iv) Host I/O Processing Logic 140 then processes the host I/O request using the page size and the indication of the total number of entries in the leaf node read from the leaf node.

v) After completing the processing of the host I/O request, Host I/O Processing Logic 140 releases the lock on the page corresponding to the logical address.

FIG. 7 is a flow chart showing an example of steps performed in some embodiments to change the size of physical pages of non-volatile data storage accessed to process host I/O requests directed to a logical storage volume.

At step 700, processing of host I/O requests directed to a logical storage volume is initially performed by accessing physical pages of non-volatile data storage having a default page size.

At step 702, an indication of an optimal page size for the logical storage volume is received.

At step 704, the size of the physical pages of non-volatile data storage accessed to process host I/O requests directed to the logical storage volume is changed from the default page size to the optimal page size for the logical storage volume at least in part by changing a size of the physical pages of non-volatile data storage that are indicated by a mapping structure that maps logical addresses in a logical address space of the logical storage volume to corresponding physical pages of non-volatile data storage from the default page size to the optimal page size for the logical storage volume.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:

initially processing host I/O requests directed to a logical storage volume by accessing physical pages of non-volatile data storage having a default page size;

receiving an indication of an optimal page size for the logical storage volume; and changing the size of the physical pages of non-volatile data storage accessed to process host I/O requests directed to the logical storage volume from the default page size to the optimal page size for the logical storage volume by changing a size of physical pages of non-volatile data storage indicated by a mapping structure that maps logical addresses for the logical storage volume to corresponding physical pages of non-volatile data storage from the default page size to the optimal page size for the logical storage volume, wherein the mapping data structure comprises a mapping tree that represents mappings between logical addresses in an address space of the logical storage volume to corresponding physical pages of non-volatile data storage contained in at least one non-volatile data storage device, and wherein changing the size of physical pages of non-volatile data storage indicated by the mapping structure includes changing a size of physical pages of non-volatile data storage indicated by each leaf node in a leaf level of the mapping tree from the default page size to the optimal page size for the logical storage volume and allocating a new physical block of contiguous non-volatile storage in the at least one non-volatile data storage device for each leaf node in the leaf level of the mapping tree.

2. The method of claim 1, further comprising:

wherein the physical pages of non-volatile data storage are contained in at least one non-volatile data storage device; and wherein processing host I/O requests directed to the logical storage volume includes issuing backend I/O operations to the non-volatile data storage device based on the mapping structure that maps logical addresses for the logical storage volume to corresponding pages of non-volatile data storage.

3. The method of claim 2, further comprising:
wherein the optimal page size for the logical storage volume is larger than the default page size; and
wherein changing the size of the physical pages accessed to process host I/O requests directed to the logical storage volume from the default page size to the optimal page size for the logical storage volume increases a page size used in the backend I/O operations issued to the non-volatile data storage device to process the host I/O requests directed to the logical storage volume from the default page size to the optimal page size for the logical storage volume.

4. The method of claim 2, further comprising:
wherein the optimal page size for the logical storage volume is smaller than the default page size; and
wherein changing the size of the physical pages accessed to process host I/O requests directed to the logical storage volume from the default page size to the optimal page size for the logical storage volume decreases a page size used in the backend I/O operations issued to the non-volatile data storage device to process the host I/O requests directed to the logical storage volume from the default page size to the optimal page size for the logical storage volume.

5. The method of claim 1, wherein each leaf node in the leaf level of the mapping tree individually includes an indication of a size of the physical pages of non-volatile data storage indicated by that leaf node, and further comprising:
wherein changing the size of the physical pages of non-volatile data storage indicated by the mapping structure further comprises changing an indication of the size of the physical pages of non-volatile data storage indicated by each leaf node in the mapping tree from the default page size to the optimal page size for the logical storage volume.

6. The method of claim 1, wherein the logical storage volume is one of a plurality of logical storage volumes, and further comprising:
changing a size of the physical pages of non-volatile data storage accessed to process host I/O requests directed to each one of the logical storage volumes from a default page size to a corresponding optimal page size for each one of the logical storage volumes, such that each logical storage volume has a different optimal page size.

7. The method of claim 6, wherein each one of the plurality of logical storage volumes stores host data generated by a different one of a plurality of applications.

8. The method of claim 7, wherein each one of the logical storage volumes has its own mapping tree that represents mappings between logical addresses in an address space of that logical storage volume to corresponding physical pages of non-volatile data storage contained in the at least one non-volatile data storage device.

9. A data storage system, comprising:
processing circuitry and memory coupled to the processing circuitry, the memory storing instructions, wherein the instructions, when executed by the processing circuitry, cause the processing circuitry to:
initially process host I/O requests directed to a logical storage volume by accessing physical pages of non-volatile data storage having a default page size;
receive an indication of an optimal page size for the logical storage volume; and
change the size of the physical pages of non-volatile data storage accessed to process host I/O requests directed to the logical storage volume from the default page size to the optimal page size for the logical storage volume by changing a size of physical pages of non-volatile data storage indicated by a mapping structure that maps logical addresses for the logical storage volume to corresponding physical pages of non-volatile data storage from the default page size to the optimal page size for the logical storage volume, wherein the mapping data structure comprises a mapping tree that represents mappings between logical addresses in an address space of the logical storage volume to corresponding physical pages of non-volatile data storage contained in at least one non-volatile data storage device, and wherein the instructions, when executed by the processing circuitry to change the size of physical pages of non-volatile data storage indicated by the mapping structure cause the processing circuitry to change a size of physical pages of non-volatile data storage indicated by each leaf node in a leaf level of the mapping tree from the default page size to the optimal page size for the logical storage volume and allocate a new physical block of contiguous non-volatile storage in the at least one non-volatile data storage device for each leaf node in the leaf level of the mapping tree.

10. The data storage system of claim 9, further comprising:
at least one non-volatile data storage device, wherein the physical pages of non-volatile data storage are contained in the least one non-volatile data storage device; and
wherein the instructions, when executed by the processing circuitry to process host I/O requests directed to the logical storage volume further cause the processing circuitry to issue backend I/O operations to the non-volatile data storage device based on the mapping structure that maps logical addresses for the logical storage volume to corresponding pages of non-volatile data storage.

11. The data storage system of claim 10, further comprising:
wherein the optimal page size for the logical storage volume is larger than the default page size; and
wherein the instructions, when executed by the processing circuitry to change the size of the physical pages accessed to process host I/O requests directed to the logical storage volume from the default page size to the optimal page size for the logical storage volume cause the processing circuitry to increase a page size used in the backend I/O operations issued to the non-volatile data storage device to process the host I/O requests directed to the logical storage volume from the default page size to the optimal page size for the logical storage volume.

12. The data storage system of claim 10, further comprising:
wherein the optimal page size for the logical storage volume is smaller than the default page size; and
wherein the instructions, when executed by the processing circuitry to change the size of the physical pages accessed to process host I/O requests directed to the logical storage volume from the default page size to the optimal page size for the logical storage volume cause the processing circuitry to decrease a page size used in the backend I/O operations issued to the non-volatile data storage device to process the host I/O requests directed to the logical storage volume from the default page size to the optimal page size for the logical storage volume.

13. The data storage system of claim 9, further comprising:
wherein each leaf node in the leaf level of the mapping tree individually includes an indication of a size of the physical pages of non-volatile data storage indicated by that leaf node; and
wherein the instructions, when executed by the processing circuitry to change the size of the physical pages of non-volatile data storage indicated by the mapping structure further cause the processing circuitry to change an indication of the size of the physical pages of non-volatile data storage indicated by each leaf node in the mapping tree from the default page size to the optimal page size for the logical storage volume.

14. A computer program product, comprising:
a non-transitory, computer-readable medium having instructions stored thereon that, when executed by processing circuitry in a data storage system, cause the processing circuitry to perform a method comprising:
initially processing host I/O requests directed to a logical storage volume by accessing physical pages of non-volatile data storage having a default page size;
receiving an indication of an optimal page size for the logical storage volume; and
changing the size of the physical pages of non-volatile data storage accessed to process host I/O requests directed to the logical storage volume from the default page size to the optimal page size for the logical storage volume by changing a size of physical pages of non-volatile data storage indicated by a mapping structure that maps logical addresses for the logical storage volume to corresponding physical pages of non-volatile data storage from the default page size to the optimal page size for the logical storage volume, wherein the mapping data structure comprises a mapping tree that represents mappings between logical addresses in an address space of the logical storage volume to corresponding physical pages of non-volatile data storage contained in at least one non-volatile data storage device, and wherein changing the size of physical pages of non-volatile data storage indicated by the mapping structure includes changing a size of physical pages of non-volatile data storage indicated by each leaf node in a leaf level of the mapping tree from the default page size to the optimal page size for the logical storage volume and allocating a new physical block of contiguous non-volatile storage in the at least one non-volatile data storage device for each leaf node in the leaf level of the mapping tree.

15. The computer program product of claim 14, further comprising:
wherein the physical pages of non-volatile data storage are contained in at least one non-volatile data storage device; and
wherein processing host I/O requests directed to the logical storage volume includes issuing backend I/O operations to the non-volatile data storage device based on the mapping structure that maps logical addresses for the logical storage volume to corresponding pages of non-volatile data storage.

16. The computer program product of claim 15, further comprising:
wherein the optimal page size for the logical storage volume is larger than the default page size; and
wherein changing the size of the physical pages accessed to process host I/O requests directed to the logical storage volume from the default page size to the optimal page size for the logical storage volume increases a page size used in the backend I/O operations issued to the non-volatile data storage device to process the host I/O requests directed to the logical storage volume from the default page size to the optimal page size for the logical storage volume.

17. The computer program product of claim 15, further comprising:
wherein the optimal page size for the logical storage volume is smaller than the default page size; and
wherein changing the size of the physical pages accessed to process host I/O requests directed to the logical storage volume from the default page size to the optimal page size for the logical storage volume decreases a page size used in the backend I/O operations issued to the non-volatile data storage device to process the host I/O requests directed to the logical storage volume from the default page size to the optimal page size for the logical storage volume.

18. The computer program product of claim 14, further comprising:
wherein each leaf node in the leaf level of the mapping tree individually includes an indication of a size of the physical pages of non-volatile data storage indicated by that leaf node; and
wherein changing the size of the physical pages of non-volatile data storage indicated by the mapping structure further comprises changing an indication of the size of the physical pages of non-volatile data storage indicated by each leaf node in the mapping tree from the default page size to the optimal page size for the logical storage volume.

* * * * *